United States Patent [19]

Goodman

[11] Patent Number: 5,121,780

[45] Date of Patent: Jun. 16, 1992

[54] FLEXIBLE AIR VALVE EXTENSION

[76] Inventor: Harold C. Goodman, 9111 Hi-View La., Louisville, Ky. 40272

[21] Appl. No.: 460,660

[22] Filed: Jan. 3, 1990

[51] Int. Cl.$^5$ .............................................. B60C 23/00
[52] U.S. Cl. .................................... 152/415; 152/427; 251/149.4
[58] Field of Search .................. 152/415, 427; 248/65; 224/42.12, 42.45 R; 251/149.4

[56] References Cited

U.S. PATENT DOCUMENTS

| | | | |
|---|---|---|---|
| 2,158,576 | 5/1939 | Glassley | 152/415 |
| 2,612,931 | 10/1952 | Orlicki | 152/415 |
| 2,692,712 | 10/1954 | Conley | 224/249 |
| 3,019,831 | 2/1962 | Morrello | 152/415 |
| 4,051,803 | 10/1977 | Arnone | 116/34 R |
| 4,256,160 | 3/1981 | More | 152/527 |
| 4,724,880 | 2/1988 | Voornas | 152/527 |
| 4,807,658 | 2/1989 | Patti | 152/415 |

Primary Examiner—John J. Gallagher
Assistant Examiner—Francis J. Lorin
Attorney, Agent, or Firm—Jerry T. Kearns

[57] ABSTRACT

A flexible air valve extension for filling an inaccessible vehicle spare tire includes an elongated flexible tube having a rigid elbow portion at one end which terminates in an internally threaded fitting dimensioned for engagement with a conventional tire valve. An externally threaded valve body at an opposite end of the flexible tube is received through a transverse flange of a mounting bracket. A pair of lock nuts are in threaded engagement with the valve body on opposite sides of the flange and secure the valve body to the bracket. The valve body includes a spring biased valve dimensioned for cooperation with conventional automotive pressure gages and air lines. The bracket is dimensioned for securement on an accessible portion of a vehicle, such as the frame of a spare tire carrier.

2 Claims, 3 Drawing Sheets

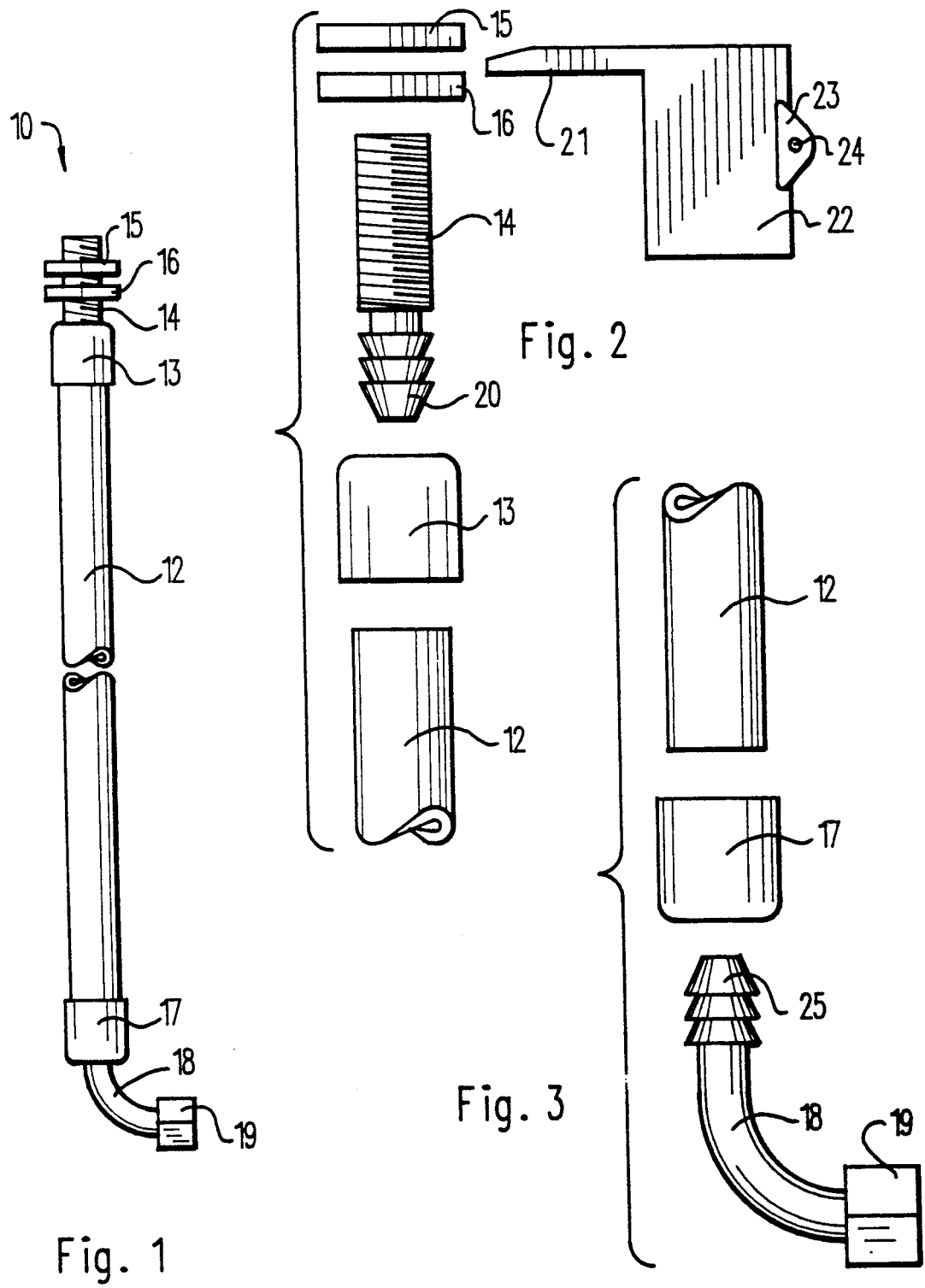

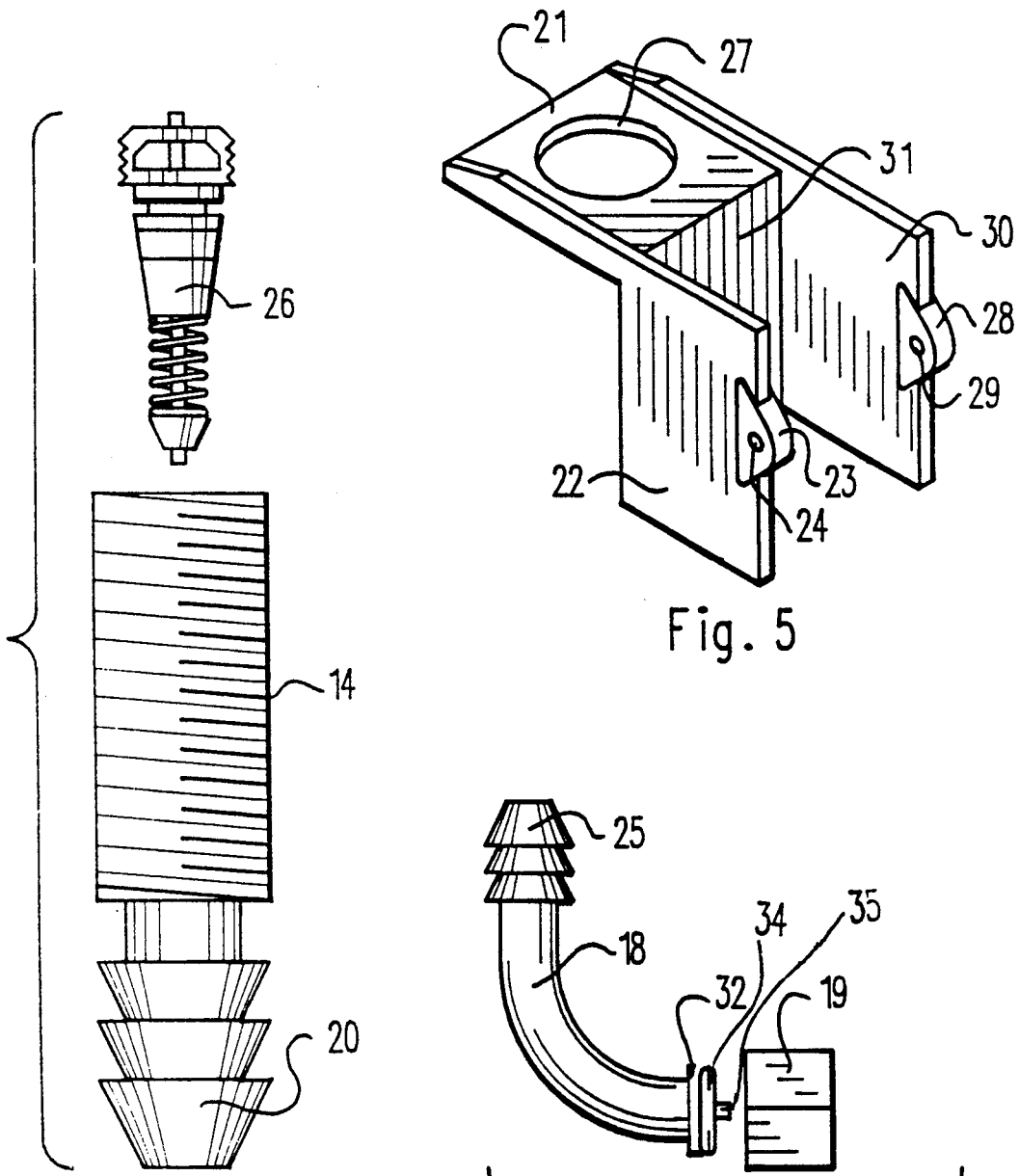

FLEXIBLE AIR VALVE EXTENSION

BACKGROUND OF THE INVENTION

1. Field of the Invention

The present invention relates to flexible air valve extensions, and more particularly pertains to a flexible air valve extension which enables an inaccessible air valve on a vehicle spare tire to be conveniently filled and connected to air pressure gages. A variety of vehicles have spare tires which are mounted in locations which make it difficult to connect an air line or pressure gage to the tire valve. Additionally, many externally mounted spare tires are enclosed by a rigid cover which also encloses the tire valve. For example, on many pickup trucks the spare tire is located beneath the rear portion of the truck bed. On many conversion vans and recreational vehicles, the spare tire is mounted on a side or rear mounted tire carrier and is enclosed by a rigid cover. In order to overcome these problems, the present invention provides a flexible air valve extension having an externally threaded valve body adapted for mounting to an accessible portion of a vehicle by a bracket.

2. Description of the Prior Art

Various types of flexible air valve extensions are known in the prior art. A typical example of such a flexible air valve extension is to be found in U.S. Pat. No. 2,692,712, which issued to T. Conley on Oct. 26, 1954. This patent discloses a bracket for securing a flexible air supply line to the belt of an individual. U.S. Pat. No. 3,019,831, which issued to C. Morrello on Feb. 6, 1962, discloses a flexible air valve extension adapted for mounting through a side wall portion of a vehicle. U.S. Pat. No. 4,051,803, which issued to C. Arnone on Oct. 4, 1977, discloses an indicator device positioned in the passenger compartment of a vehicle to warn the operator of the vehicle when the air pressure in the spare tire disposed in a remote location is too low for emergency use. The device utilizes an elongated air line. U.S. Pat. No. 4,256,160, which issued to J. More on Mar. 17, 1981, discloses a device for remote monitoring and filling of vehicle mounted spare tires. A flexible air line is connected to a spare tire valve and is secured by a belt which is received around the spare tire. U.S. Pat. No. 4,724,880, which issued to N. Voornas on Feb. 16, 1988, discloses a flexible air line for filling a spare tire having an inaccessible valve. A pressure gage is connected to an extension tube for constantly indicating the air pressure of the tire.

While the above mentioned devices are directed to flexible air valve extensions, none of these devices disclose a flexible air valve extension embodying the concepts and constructional details of the present invention as illustrated and described subsequently. Inasmuch as the art is relatively crowded with respect to these various types of flexible air valve extensions, it can be appreciated that there is a continuing need for and interest in improvements to such flexible air valve extensions, and in this respect, the present invention addresses this need and interest.

SUMMARY OF THE INVENTION

In view of the foregoing disadvantages inherent in the known types of flexible air valve extensions now present in the prior art, the present invention provides an improved flexible air valve extension. As such, the general purpose of the present invention, which will be described subsequently in greater detail, is to provide a new and improved flexible air valve extension which has all the advantages of the prior art flexible air valve extensions and none of the disadvantages.

To attain this, a representative embodiment of the concepts of the present invention is illustrated in the drawings and makes use of a flexible air valve extension for filling an inaccessible vehicle spare tire which includes an elongated flexible tube having a rigid elbow portion at one end which terminates in an internally threaded fitting dimensioned for engagement with a conventional tire valve. An externally threaded valve body at an opposite end of the flexible tube is received through a transverse flange of a mounting bracket. A pair of lock nuts are in threaded engagement with the valve body on opposite sides of the flange and secure the valve body to the bracket. The valve body includes a spring biased valve dimensioned for cooperation with conventional automotive pressure gages and air lines. The bracket is dimensioned for securement on an accessible portion of a vehicle, such as the frame of a spare tire carrier.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the public generally, and especially those who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved flexible air valve extension which has all the advantages of the prior art flexible air valve extensions and none of the disadvantages.

It is another object of the present invention to provide a new and improved flexible air valve extension which may be easily and efficiently manufactured and marketed.

It is a further object of the present invention to provide a new and improved flexible air valve extension which is of a durable and reliable construction.

An even further object of the present invention is to provide a new and improved flexible air valve extension which is susceptible of a low cost of manufacture with regard to both materials and labor, and which accordingly is then susceptible of low prices of sale to the consuming public, thereby making such flexible air valve extensions economically available to the buying public.

Still yet another object of the present invention is to provide a new and improved flexible air valve extension which provides in the apparatuses and methods of the prior art some of the advantages thereof, while simultaneously overcoming some of the disadvantages normally associated therewith.

Still another object of the present invention is to provide a new and improved flexible air valve extension to enable vehicle mounted spare tires having an inaccessible air valve to be conveniently connected to pressure gages and air lines.

Yet another object of the present invention is to provide a new and improved flexible air valve extension including a remote air valve mounted on an accessible portion of a vehicle by a bracket.

Even still another object of the present invention is to provide a new and improved flexible air valve extension which utilizes a bracket to mount a remote air valve on the frame of a vehicle spare tire carrier.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side elevational view of the flexible air valve extension of the present invention.

FIG. 2 is an exploded side view illustrating the assembly of the remote extension valve body and mounting bracket.

FIG. 3 is a perspective elevational view illustrating the assembly of the spare tire valve engaging fitting.

FIG. 4 is an exploded elevational view illustrating the constructional details of the remote extension valve body.

FIG. 5 is a perspective view illustrating the remote air valve body mounting bracket.

FIG. 6 is an exploded side view illustrating the constructional features of the spare tire valve engaging fitting.

FIG. 7 is a front view illustrating a release washer for releasing the valve stem of a spare tire.

DESCRIPTION OF THE PREFERRED EMBODIMENT

Figure 8:
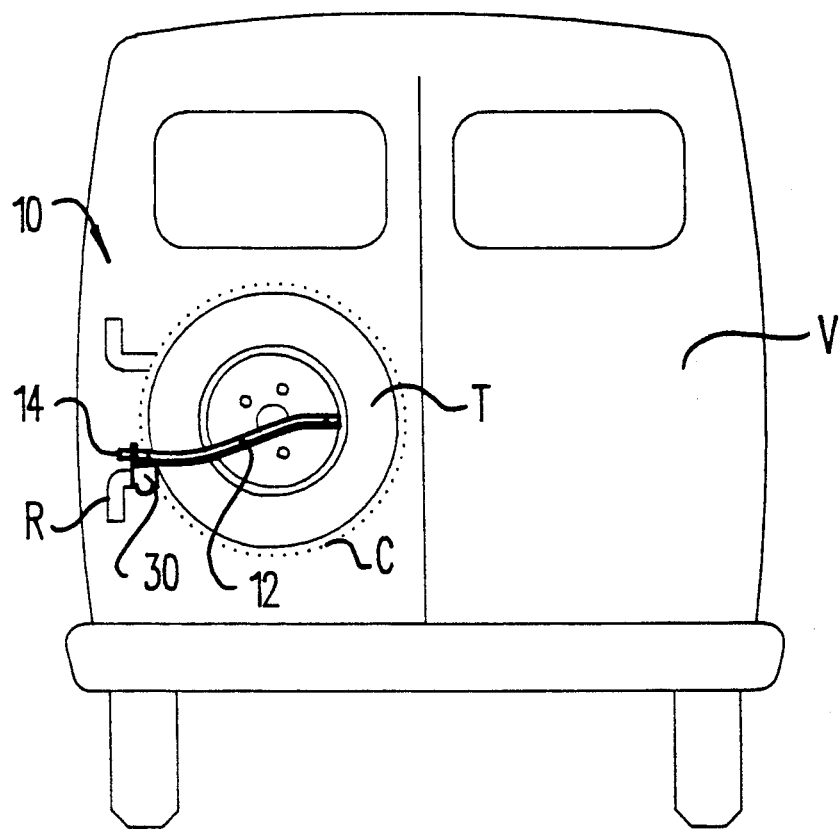
FIG. 8 is a rear view of the flexible air valve extension of the present invention mounted on a spare tire of a conventional vehicle.

With reference now to the drawings, and in particular to FIG. 1 thereof, a new and improved flexible air valve extension embodying the principles and concepts of the present invention and generally designated by the reference numeral 10 will be described.

More specifically, it will be noted that the first embodiment 10 of the invention includes an elongated flexible tube 12, which may be formed from a variety of flexible rubber and plastic materials. A rigid elbow portion 18, formed from a metal tubing material is secured at one end of the tube 12 by a crimp sleeve 17. An internally threaded fitting 19 is rotatably captured to a free end of the elbow 18, and is dimensioned for engagement with a conventional tire air valve. An externally threaded valve body 14 is secured by a crimp sleeve 13 at an opposite end of the tube 12 and includes a pair of threaded lock nuts 15 and 16.

As shown in FIG. 2, the lock nuts 15 and 16 are utilized to mount the valve body 14 to a perpendicular flange 21 of a mounting bracket. The mounting bracket includes a first side wall 22 having a mounting boss 23 provided with a circular aperture 24. The construction of the mounting bracket will be described subsequently in greater detail. The remote air valve body 14 includes a compression fitting 20 for engagement with a crimp sleeve 13. The opposite end of the crimp sleeve 13 is secured to the tube 12.

FIG. 3 is an exploded view which illustrates the construction of the tire valve engaging fitting. The elbow portion 18 includes a compression fitting 25 secured to the crimp sleeve 17, which is in turn secured to the tube 12.

FIG. 4 is an exploded elevational view illustrating the valve body 26, which is mounted interiorly within the valve body 14. The valve 26 is of the conventional type, which is biased to a closed position by a coil spring, until an upwardly directed release stem is depressed. This construction allows the remote air valve body 14 to be connected in a conventional manner to standard compressor air lines and automotive tire pressure gages.

FIG. 5 is a perspective view which further illustrates the construction of the remote mounting bracket. The bracket includes a pair of parallel side walls 22 and 30 connected by a transverse end wall 31. The perpendicular flange 21 includes a central circular aperture 27 dimensioned to receive the valve body 14. A pair of aligned bosses 23 and 28 are provided on the side walls 22 and 30, and include respective aligned apertures 24 and 29 dimensioned for the reception of a fastening screw or bolt. The mounting bracket illustrated in FIG. 5 is adapted for securement to the tubular frame of a conventional vehicle spare tire carrier, of the type utilized to mount spare tires on the rear portion of conversion vans and other recreational vehicles.

FIG. 6 is an exploded view which illustrates the construction of the tire valve engaging fitting. A radial flange 32 is formed at a free end of the elbow portion 18, and serves to rotatably capture the internally threaded nut 19 on the end portion of the elbow 18. A release washer 34 is integrally cast with, or otherwise secured to the flange 32. The release washer 34 has an end portion 35 disposed and dimensioned for abutment with the valve release stem of a conventional tire valve. Thus, upon tightening the nut 19 onto the conventional externally threaded tire valve, the portion 35 of the circular washer 34 will depress the valve release stem, resulting in fluid communication between the interior of the vehicle spare tire and the flexible air valve extension.

FIG. 7 is a front view further illustrating the construction of the release washer 34. As shown, the washer 34 has a generally circular body portion with radially extending air passages lying in a common plane. The free end 35 is formed to extend perpendicular to the plane of the circular body portion and to lie along a central longitudinal axis thereof.

FIG. 8 is a rear view of a conventional van V having a rear mounted spare tire T, covered by a conventional rigid cover C, which is illustrated in dotted line for clarity of illustration. The flexible air valve extension 10 is secured to the spare tire air valve, and extends beneath the cover C. The remote air valve 14 is secured by the mounting bracket, the side wall 30 of which is illustrated, to the rod member R which forms the spare tire carrier frame. Thus, an individual may monitor and fill the spare tire T, through the use of the remote air valve body 14, without removing the cover C.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A flexible air valve extension for filling an inaccessible vehicle spare tire, comprising:
   an elongated flexible tube;
   a rigid elbow portion at one end of said tube;
   an internally threaded fitting at a free end of said elbow portion and dimensioned for engagement with a conventional tire valve;
   projection means in said internally threaded fitting for opening a tire air valve when engaged with said fitting;
   an externally threaded valve body at an opposite end of said flexible tube;
   a valve in said valve body biased by a spring to a closed position, said valve body dimensioned for engagement with conventional standard automotive air gages and air lines; and
   bracket means for securing said valve body to an accessible portion of a vehicle, said bracket means including a bracket having an open channel configuration formed by two parallel side walls connected by a transverse end wall, a perpendicular flange at a top end of said transverse end wall, a central circular aperture formed through said flange, said aperture dimensioned to receive said externally threaded valve body, a pair of lock nuts in threaded engagement with said externally threaded valve body, on opposite sides of said flange, said lock nuts securing said externally threaded valve body to said flange, and a pair of aligned bosses on said parallel side walls, said bosses having axially aligned apertures dimensioned to receive a fastening bolt for securing said bracket to a tire carrier frame of a vehicle.

2. The flexible air valve extension of claim 1, wherein said projection means comprising a circular washer secured within said internally threaded fitting;
   said washer having a free end portion extending transversely to a plane of a circular body portion of said washer; and
   said free end portion lying on a central longitudinal axis of said circular washer body portion and disposed for engagement with a valve release stem of a conventional tire valve.

* * * * *